US009437034B1

(12) United States Patent
Wei et al.

(10) Patent No.: US 9,437,034 B1
(45) Date of Patent: Sep. 6, 2016

(54) MULTIVIEW TEXTURING FOR THREE-DIMENSIONAL MODELS

(71) Applicant: Google Inc., Mountain View, CA (US)

(72) Inventors: Xiaolin Wei, Fremont, CA (US); Tilman Reinhardt, Woodside, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/569,833

(22) Filed: Dec. 15, 2014

(51) Int. Cl.
*G06T 15/00* (2011.01)
*G06T 15/04* (2011.01)
*G06T 17/05* (2011.01)
*G06T 17/00* (2006.01)
*G06T 3/40* (2006.01)

(52) U.S. Cl.
CPC .............. *G06T 15/04* (2013.01); *G06T 17/00* (2013.01); *G06T 17/05* (2013.01); *G06T 3/40* (2013.01)

(58) Field of Classification Search
CPC ......... G06T 3/40; G06T 17/00; G06T 15/04; G06T 17/05
USPC ................ 345/419, 420, 423, 501, 581, 582
See application file for complete search history.

(56) References Cited

U.S. PATENT DOCUMENTS

| | | | |
|---|---|---|---|
| 6,525,731 B1 | 2/2003 | Suits et al. | |
| 7,348,989 B2 | 3/2008 | Stevens et al. | |
| 7,583,275 B2 * | 9/2009 | Neumann | G06T 17/00 345/419 |
| 7,839,421 B2 * | 11/2010 | Bethune | G06T 3/40 345/501 |
| 8,279,218 B1 | 10/2012 | Fan et al. | |

2013/0009950 A1 1/2013 Ben-David et al.

OTHER PUBLICATIONS

Lee, Chang Ha. "Displacement Mapping with an Augmented Patch Mesh." IEICE Transactions on Information and Systems 98.3 (2015): 741-744.*
Debevec et al., "Modeling and Rendering Architecture from Photographs: A Hybrid Geometry-and Image-Based Approach", $23^{rd}$ International Conference on Computer Graphics and Interactive Techniques, New Orleans, Louisiana, Aug. 4-9, 1996, 10 pages.
Gal et al., "Seamless Montage for Texturing Models", Computer Graphics Forum (Eurographics), vol. 29, No. 2, 2010, pp. 479-486.
Grimm et al., "Technical Report WUCS-2002-9: Creating View-Dependent Texture Maps", Nov. 22, 2000, Washington University in St. Louis, Department of Computer Science & Engineering, 9 pages.
Lempitsky et al., "Seamless Mosaicing of Image-Based Texture Maps", IEEE Computer Society Conference on Computer Vision and Pattern Recognition, Minneapolis, Minnesota, Jun. 18-23, 2007, 6 pages.

(Continued)

*Primary Examiner* — Phu K Nguyen
(74) *Attorney, Agent, or Firm* — Dority & Manning, P.A.

(57) ABSTRACT

Systems and methods for generating textures to be rendered in conjunction with a polygon mesh are provided. More particularly, a polygon mesh modeling a geographic area can be accessed. A plurality of source images depicting the geographic area can then be identified. The plurality of source images can be aligned to reduce projection misalignments between source images when the source images are projected to the polygon mesh. A texture can then be determined based at least in part on a weighted average of pixels in the plurality of source images corresponding to a point on the surface of the polygon mesh. Determining a texture can include removing at least one outlier pixel associated with a moving object from the weighted average.

20 Claims, 5 Drawing Sheets

(56) References Cited

OTHER PUBLICATIONS

Porquet et al., "Real-Time High-Quality View-Dependent Texture Mapping using Per-Pixel Visibility", $3^{rd}$ International Conference on Computer Graphics and Interactive Techniques in Australia and South East Asia, Dunedin, New Zealand, Nov. 30-Dec. 2, 20015, pp. 213-220.

Zhou et al., "Color Map Optimization for 3D Reconstruction with Consumer Depth Cameras", ACM Transactions on Graphics, vol. 33, No. 3, Article 155, Jun. 2014, 10 pages.

* cited by examiner

MULTIVIEW TEXTURING FOR THREE-DIMENSIONAL MODELS

FIELD

The present disclosure relates generally to image processing and more particularly to generating textures to be rendered in conjunction with a polygon mesh to provide a textured three dimensional model.

BACKGROUND

In recent years, the realistic reconstruction of three-dimensional models has become increasingly in demand. Three-dimensional model reconstruction can involve the generation of a representation of a three-dimensional geometry of an object. Applications for such three-dimensional model reconstructions include, for instance, geographic information systems, three-dimensional printing, three-dimensional gaming, etc. Three-dimensional geometries can be represented, for instance, by a polygon mesh having interconnected geometric entities such as triangles and/or various other polygons.

Textures can be applied to the polygon mesh to add color, shading, lighting, etc. to the three-dimensional model. For instance, a three-dimensional model of a geographic area can include a polygon mesh modeling the geometry of the geographic area (e.g. terrain, building, and/or other objects). Imagery of the geographic area captured by a camera, such as aerial imagery or satellite imagery, can be texture mapped to the polygon mesh so that the three-dimensional model provides a more accurate and realistic representation of the scene.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for determining a texture for rendering in conjunction with a three-dimensional model of a geographic area. The method includes accessing by one or more computing devices, a polygon mesh modeling a geographic area. The method further includes identifying, by the one or more computing devices, a plurality of source images depicting the geographic area. The method further includes aligning, by the one or more computing devices, the plurality of source images to reduce projection misalignments between source images when projected to the polygon mesh. The method further includes determining, by the one or more computing devices, a texel value for a texture associated with a point on the surface of the polygon mesh based at least in part on a weighted average. The weighted average is determined at least in part from the pixels in the plurality of source images corresponding to the point on the surface of the polygon mesh. At least one outlier pixel in the plurality of source images corresponding to the point on the surface of the polygon mesh is removed from inclusion in the weighted average in determining the texel value for the point on the surface of the polygon mesh.

Other aspects of the present disclosure are directed to systems, apparatus, tangible, non-transitory computer-readable media, user interfaces and devices for generating textures to be rendered in conjunction with a polygon mesh.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
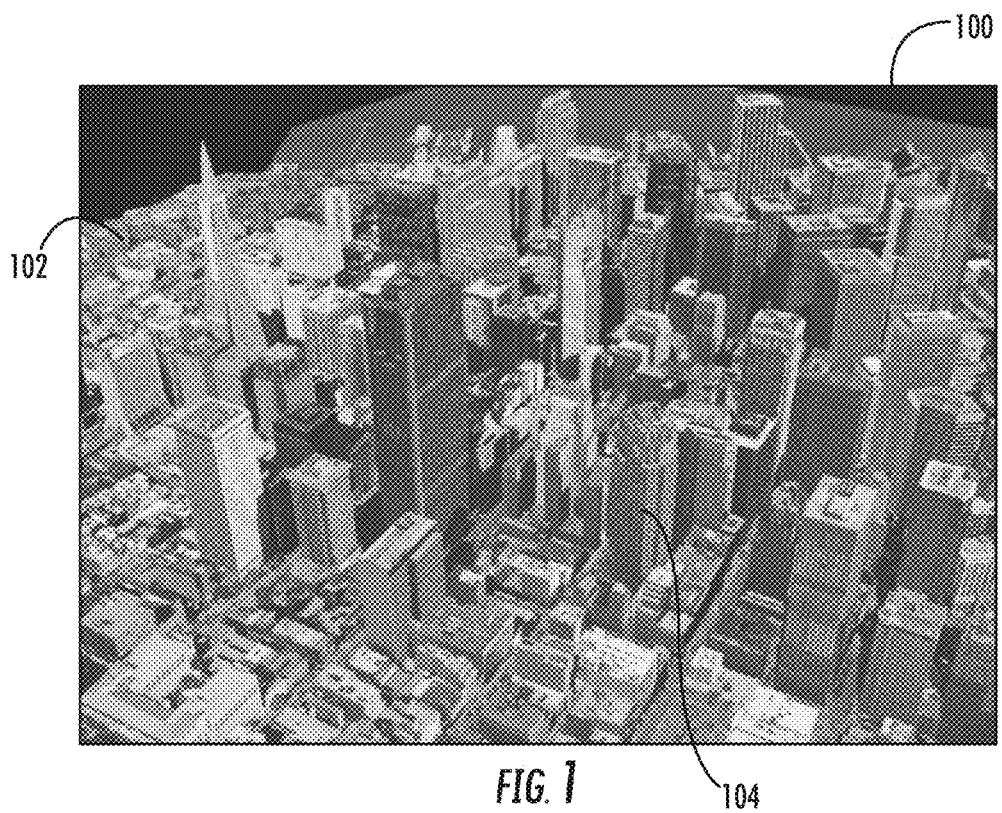
FIG. 1 depicts an example textured three-dimensional model of a geographic area.

Reference will now be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Overview

Example aspects of the present disclosure are directed to generating textures to be rendered in conjunction with a polygon mesh to provide a textured three-dimensional model, for instance, of a geographic area. Constructing realistic three-dimensional models is one of the most sought-after goals in computer vision, including in three-dimensional mapping, three-dimensional printing, gaming, etc. Three-dimensional models can include a polygon mesh used to model, for instance, the geometry of an object or scene.

Existing approaches to texturing three-dimensional models can include segmenting the polygon mesh into a plurality of segments (e.g. polygon faces) and texturing each segment with an assigned image. Blending, such as multi-band blending can be performed to reduce seams between textured segments. For instance, FIG. 1 depicts an example textured three-dimensional model 100 of a geographic area 102 generated using an existing approach. As evidenced by FIG. 1, texturing with this approach can result in inconsistencies in the three-dimensional model. For instance, a building facade, such as building facade 104, can be textured with a bright image on the right and a dark image on the left, which can look unnatural, even after performing blending.

According to example aspects of the present disclosure, for any point on the polygon mesh, all available pixels from source images that see the point on the polygon mesh can be merged to generate the texture for the three-dimensional model. To effectively merge pixels from different source images, however, pixel-to-pixel correspondences between the source images must be determined.

In a particular example, a polygon mesh can be accessed for texture mapping. The polygon mesh can represent a three-dimensional model of the geometry of a geographic area. The polygon mesh can, for instance, be made up of interconnected polygons (e.g. triangles) and can include various vertices and edges. The polygon mesh can have a plurality of three-dimensional points that represent points on a surface of the geometry of the geographic area.

Once the polygon mesh has been accessed, a plurality of source images can be identified. Each source image of the plurality of source images can, for instance, be an aerial or satellite image having a pixel that depicts a point corresponding to a point on the surface of the polygon mesh. For instance, a polygon mesh that models a landmark in a geographic area can have a plurality of three-dimensional points that represent points on the surface of the landmark. A plurality of source images can be identified for a particular point on the surface of the polygon mesh (e.g. mesh point) such that each source image from the plurality of source images depicts the point on the surface of the landmark corresponding to that mesh point. Each source image can have an associated pose. As used herein, the pose of an image refers to the position and/or orientation of a camera that captured the image relative to a reference. The pixels in the plurality of source images that depict the point in the geographic area corresponding to the mesh point can be merged to create a robust, consistent texture to be rendered in conjunction with the polygon mesh.

Because both the polygon mesh and the source image poses can contain errors, the pixels from the plurality of source images may not perfectly align when projected onto the polygon mesh. For instance, a window represented in the polygon mesh can be depicted in multiple source images, each captured from a different viewpoint. However, when the window is projected from each source image onto the polygon mesh, the projections can be slightly misaligned from image to image. Merely merging or averaging these projections can yield a blurred or otherwise misaligned window.

Accordingly, a texture alignment process can be used to refine the poses of each source image. These pose refinements can aim to minimize pixel-wise differences across the plurality of source images when projected onto the polygon mesh. The texture alignment can be achieved using, for instance, an approximate pose model. The approximate pose model can use a global shift plus a grid-based warping function to align corresponding pixels of the plurality of source images.

The texture alignment can include an optimization objective of refining the poses of the source images that see the mesh point such that projection misalignment between image pairs is minimized or reduced. In particular, at least one image pair can be identified. Each image in each image pair can depict a point in the geographic area corresponding to the mesh point. The optimization objective can include optimizing an alignment parameter for each source image such that the projection misalignment is minimized over the sum of all image pairs.

The texture alignment can further include optimizing a texel color for the mesh point. In particular, the optimization problem can include simultaneously solving for an optimized texel color and for an optimized alignment parameter for each source image that sees the mesh point, where both the alignment parameter and texel color are unknowns. In particular, adjusting the pose of a source image that sees a point on the surface of a polygon mesh can alter both the alignment parameter of the source image, and the texel color when the source image is projected onto the polygon mesh. Accordingly, texture alignment can include an optimization problem of refining the pose of each source image from the plurality of source images to simultaneously minimize or reduce both the projection misalignments between the source images, and the difference between the optimized texel color and the pixel color of each source image.

For instance, each source image can project onto a mesh point a pixel having a different color value. An optimized texel color can be found such that the sum of the differences between the optimized texel color and the pixel color in each source image can be minimized or reduced. This can be achieved by refining the pose of each source image of the plurality of source images. However the optimization can also aim to reduce projection misalignments between the source images. This can also be achieved by refining the poses of source images. Accordingly, the poses can be refined such that the refinement simultaneously reduces both the projection misalignments between source images and the color difference between the texel and each source image.

A simultaneous optimization of alignment parameters and texel color can require significant computing resources. Accordingly, the optimization can be broken down into multiple smaller optimizations. For instance, in a particular implementation, the optimization of the alignment parameter for each source image that sees the mesh point can be performed separately and iteratively in relation to the optimization of the texel color. In particular, the texel color can first be optimized by fixing the alignment parameter and solving for the texel color. The alignment parameter can then be optimized by fixing the texel color and solving for the alignment parameter. This process can be repeated until the optimization converges. Upon convergence, both the optimized alignment parameters and texel colors can be found with little complexity.

According to particular aspects of the present disclosure, an image-level outlier detection can be used to detect and remove badly aligned source images. For instance, if there is a source image that is still misaligned after the texture alignment process is complete, that image can be removed from the plurality of source images.

Once the texture alignment process is complete, a texture associated with the polygon mesh can be determined. A texel value for the texture can be determined based at least in part on a weighted average of all available source images that see to a mesh point. A texel value can be, for instance, a color value for the texel.

A weight can be assigned to each source image for each mesh point that the source image sees. The weight assigned to a source image can be determined based on various factors. For instance, a weight can be determined based at least in part on the distance between a camera position associated with a source image and the point on the geometry of the geographic area that corresponds to the mesh point, a visibility score indicative of the degree to which the point on the geometry of the geographic area corresponding to the mesh point is visible in a source image, and/or viewing direction of a source image relative to the point on the geometry of the geographic area corresponding to the mesh point. Once the weights are assigned to the source images, a weighted average of pixel color values that corresponds to a mesh point can be determined.

The weighted average can be indicative of how well a source image sees the mesh point. For instance, an image that does not depict a point corresponding to the mesh point can have a weight of zero. An image that depicts the point from a straight viewing direction can have a higher weight. The weighted average of all available pixels can provide a more robust color measurement than can a single pixel from a single source image.

According to particular aspects of the present disclosure, a per-texel outlier detection can also be used to detect and remove one or more outlier pixels in the plurality of source images in determining the weighted average. The one or more outlier pixels can depict, for instance, moving objects, such as automobiles traveling down a highway. The one or more outlier pixels can be removed from the weighted average in determining a texture for a polygon mesh. This can allow for the removal of moving or transient objects, such as automobiles, from the three-dimensional model.

Once the texture is determined, the texture can be processed to improve the texture appearance. The processing can include a histogram stretching process that can restore contrast lost during the merging. The processing can further include a texture sharpening process. The texture sharpening can increase the resolution of the texture. In an example embodiment, the texture sharpening process can provide a texture with a higher resolution than the original source images.

Figure 2:
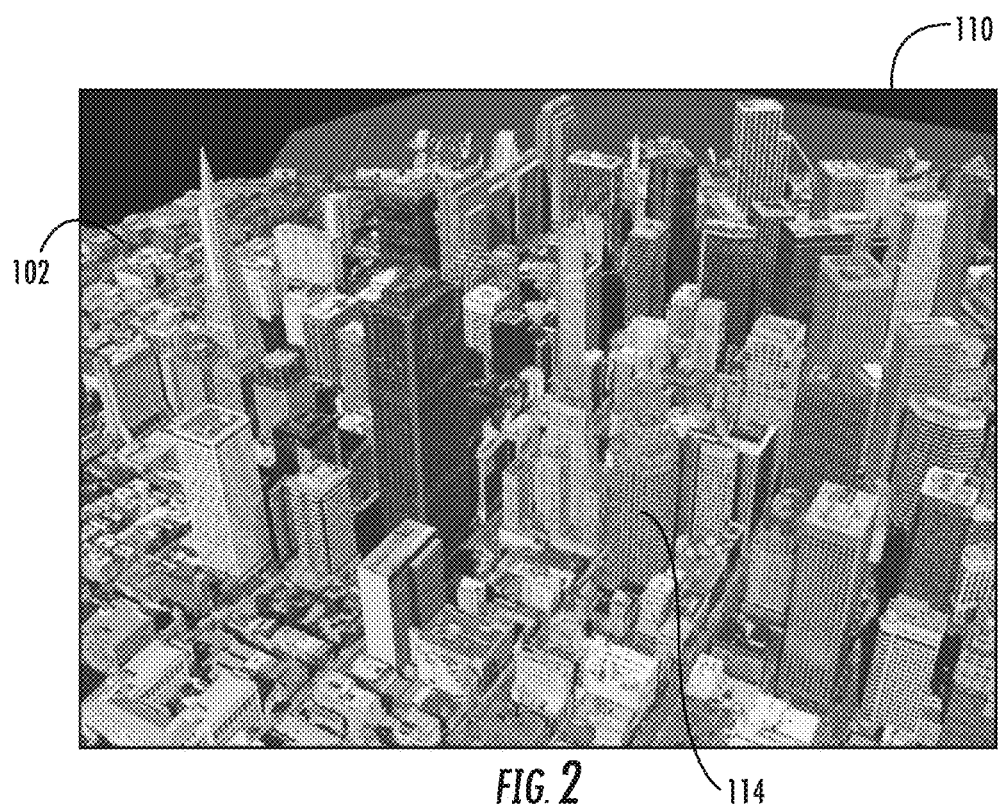
FIG. 2 depicts an example textured three-dimensional model of a geographic area according to example embodiments of the present disclosure.

For instance, FIG. 2 depicts an example textured three-dimensional model 110 of geographic area 102 according to example embodiments of the present disclosure. Model 110 models the same geographic area 102 as model 100 depicted in FIG. 1. Model 110 can include a texture rendered in conjunction, for instance, with a polygon mesh. The texture can be determined based at least in part on a weighted average of pixels in a plurality of source images corresponding to a point on the surface of a polygon mesh. The rendered texture can provide a sharper, more consistent appearance. For instance, building facade 114, which corresponds to building facade 104 in FIG. 1, displays a more natural texture with more consistent lighting.

Example Methods for Determining Textures

Figure 3:
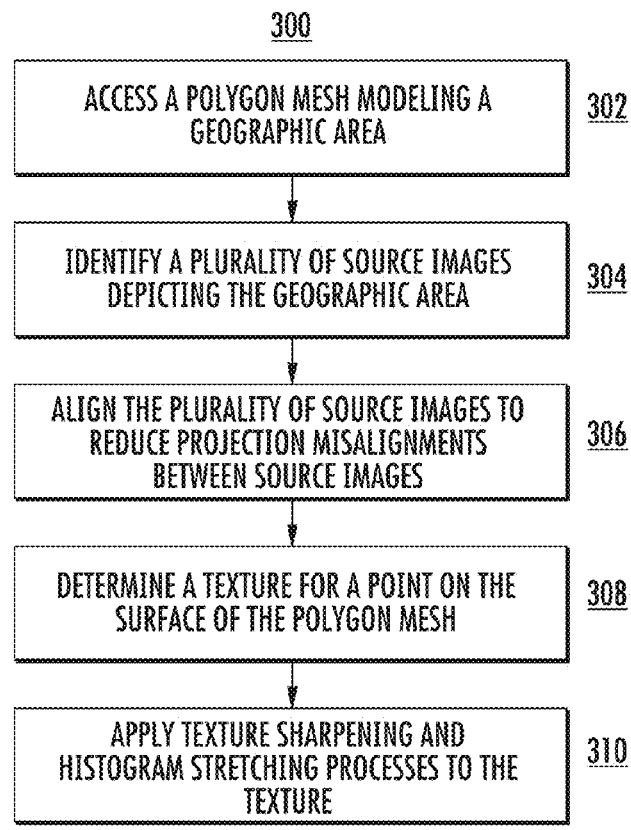
FIG. 3 depicts a flow chart of an example method for determining a texture associated with a polygon mesh according to example embodiments of the present disclosure.

FIG. 3 depicts a flow chart of an example method (300) for texturing a three-dimensional polygon mesh. Method (300) can be implemented by one or more computing devices, such as one or more of the computing devices depicted in FIG. 8. In addition, FIG. 3 depicts steps performed in a particular order for purposes of illustration and discussion. Those of ordinary skill in the art, using the disclosures provided herein, will understand that the various steps of any of the methods disclosed herein can be omitted, adapted, modified, rearranged, or expanded in various ways without deviating from the scope of the present disclosure.

At (302), method (300) can include accessing a polygon mesh for texturing. The polygon mesh can be a three-dimensional model of the geometry of a geographic area. The polygon mesh can, for instance, be a stereo reconstruction generated from imagery depicting the geographic area. The polygon mesh can, for instance, be made up of interconnected polygons (e.g. triangles) that can include various vertices and edges. The polygon mesh can include various mesh points that represent individual points along the surface of the geometry of a geographic area. A mesh point can represent, for instance, a point on a landmark, such as a building or terrain.

Figure 4:
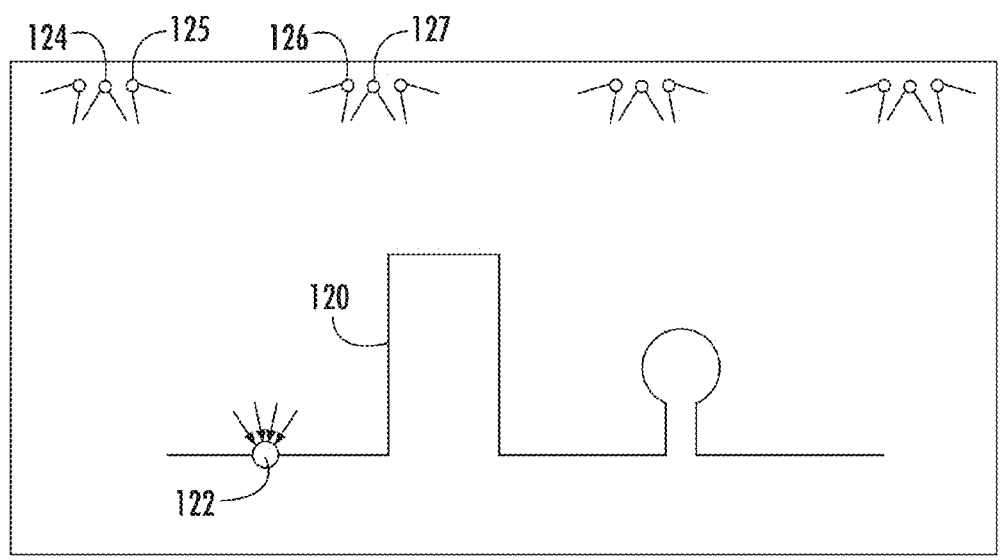
FIG. 4 depicts an example model of a geographic area according to example embodiments of the present disclosure.

For instance, FIG. 4 depicts an example view of a three-dimensional model 120 of the geometry of a geographic area according to example embodiments of the present disclosure. Three-dimensional model 120 can be, for instance, a polygon mesh. Three-dimensional model 120 includes mesh point 122 along the geometry of the geographic area.

Referring back to FIG. 3, once the polygon mesh has been accessed, method (300) can include identifying a plurality of source images (304). The plurality of source images can include, for instance, aerial, satellite or other images that depict a point on the geometry of the geographic area that corresponds to a mesh point in the polygon mesh. Each source image of the plurality of source images can have an associated pose.

For instance, FIG. 4 depicts a plurality of aerial images, such as aerial images 124, 125, 126 and 127. As shown in FIG. 4, aerial images 124, 125, 126 and 127 each depict a point on the geometry of the geographic area that corresponds to mesh point 122. Accordingly, aerial images 124, 125, 126 and 127 can be identified as source images that can be used to determine a texture for three-dimensional model 120.

Referring back to FIG. 3, method (300) can include aligning the plurality of source images (306). Both the reconstructed mesh and the poses associated with the plurality of source images can have errors that can cause projection misalignments between source images when the source images are projected onto the polygon mesh. Such projection misalignments can facilitate inaccurate or blurred textures. Accordingly, the plurality of source images can be aligned such that the projection misalignments are reduced or even eliminated.

Aligning the plurality of source images can include refining the poses of the source images such that projection misalignments between source images are reduced. Further, the poses can also be refined to determine an optimized texel color such that the difference between the texel color and the pixel colors of the pixels in the plurality of source images that correspond to the mesh point is minimized. The source images can be aligned using, for instance, an approximate pose model. The approximate pose model can use a global shift plus a grid-based warping function to align corresponding pixels of the plurality of source images.

A source image pose refinement can be determined based at least in part on an optimized alignment parameter associated with the source image. An optimized alignment parameter can be a pose of a source image such that projection misalignments between the source images are minimized or reduced. The pose refinement can further be determined based at least in part on an optimized texel color. An optimized texel color can be the texel color that minimizes or reduces the differences between a texel color and the pixel colors of each pixel in the plurality of source images corresponding to the mesh point. Accordingly, the source image pose can be refined such that the sum of the projection misalignments and the color differences is simultaneously minimized.

However, for large polygon meshes, such simultaneous optimization can require significant computing resources. Accordingly, the optimized alignment parameter and the optimized texel color can be solved for separately and iteratively. In particular, the texel color can first be optimized by fixing the alignment parameter and solving for the texel color. The alignment parameter can then be optimized by fixing the texel color and solving for the alignment parameter. This process can be repeated until the optimization converges. Upon convergence, both the optimized alignment parameters and texel colors can be found with little complexity.

Figure 5:
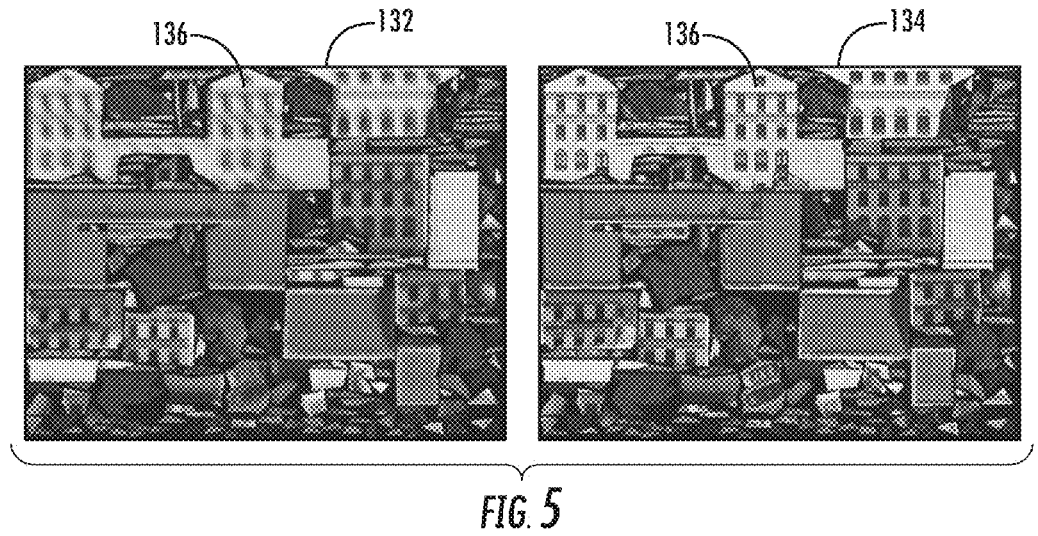
FIG. 5 depicts example results of aligning a plurality of source images according to example embodiments of the present disclosure.

FIG. 5 depicts example results of an alignment process. In particular, FIG. 5 depicts a texture 132 resulting from a plurality of source images that have not been aligned, and a texture 134 resulting from a plurality of source image that have been aligned according to example aspects of the present disclosure. As evidenced in FIG. 5, aligning the source images in this manner can facilitate a clear, less blurred texture. For instance, building facade 136, as displayed in texture 134 can be crisper and clearer than building facade 136 as depicted in texture 132.

Referring back to FIG. 3, once the source images have been aligned, method (300) can include determining a texture for rendering in conjunction with the polygon mesh (308). In particular, the texture can be determined by assigning a weight to each source image that sees a mesh point, and determining a weighted average of pixel color values of the pixels in the plurality of source images corresponding to the mesh point. For instance, in FIG. 4, a weighted average can be determined for aerial images 124, 125, 126 and 127.

Figure 6:
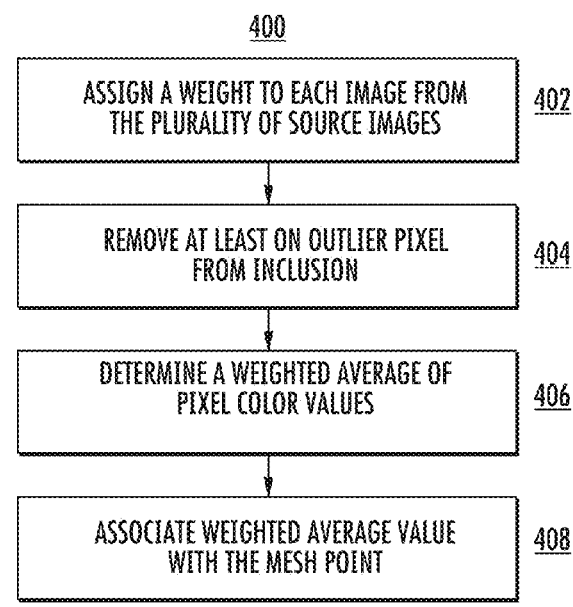
FIG. 6 depicts a flow chart of an example method for determining a texture associated with a polygon mesh according to example embodiments of the present disclosure.

FIG. 6 depicts a flow chart of an example method (400) for determining a texture for a polygon mesh according to example embodiments of the present disclosure. Method (400) can include assigning a weight to each source image from the plurality of source images (402). A weight can be assigned to each source image for each mesh point that the source image sees. For instance, a particular source image can have a different weight for each mesh point that the source image sees. Weights can be assigned to the source images based on various factors. Such factors can include, for instance, the distance between the location of a source image and the point on the geometry of the geographic area that corresponds to the mesh point, a visibility score indicative of how well a source image sees the point corresponding to the mesh point and/or viewing direction of a source image relative to the point corresponding to the mesh point.

At (404) one or more outlier pixels in the plurality of source images corresponding to the mesh point can be identified and excluded from determining the weighted average. The one or more outlier pixels can be associated with, for instance, a moving object such as an automobile or boat. Such outlier pixels can be removed from the weighted average, and not included in determining a texture for the polygon mesh.

Figure 7:
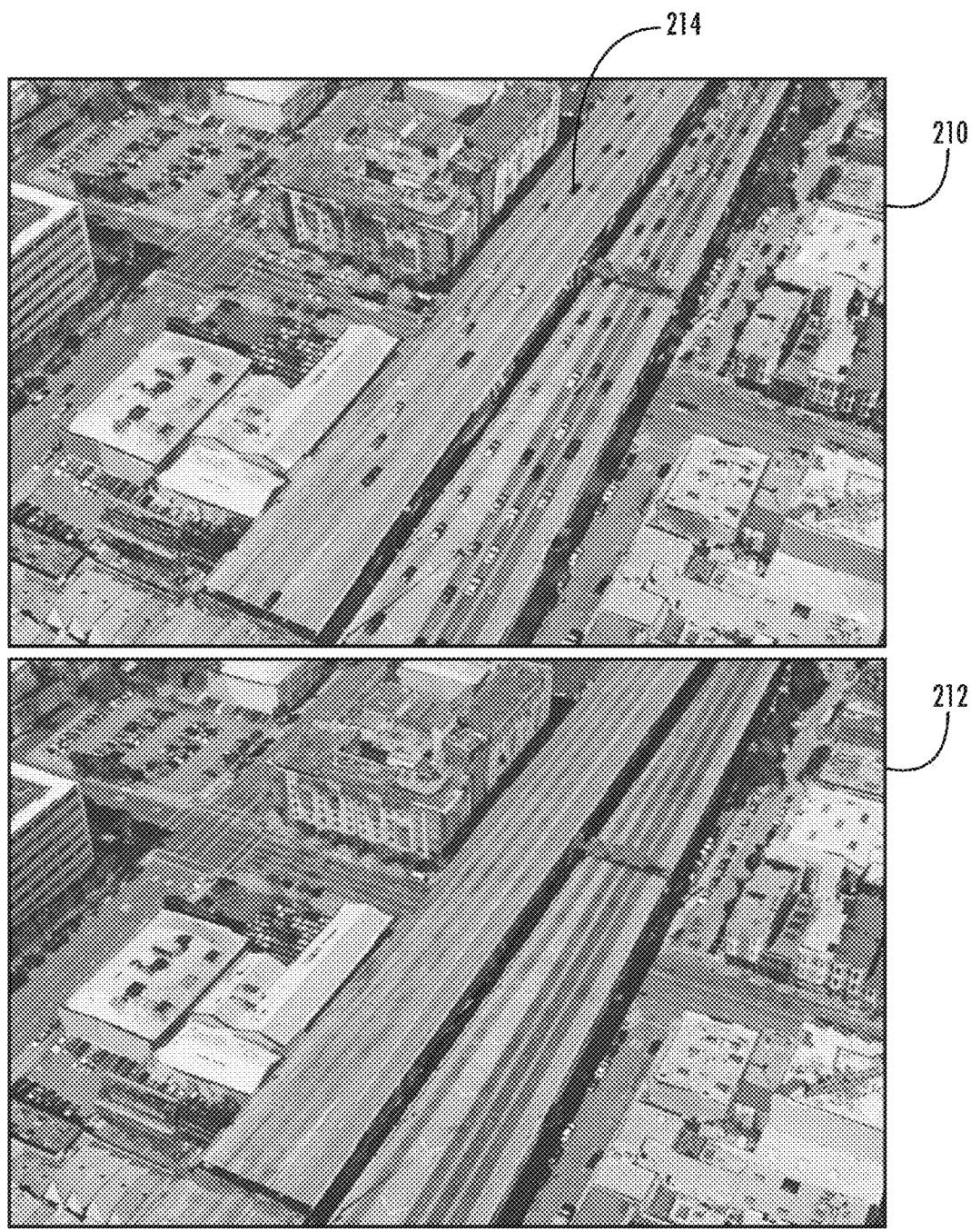
FIG. 7 depicts the results of an example outlier pixel removal process according to example embodiments of the present disclosure.

For instance, FIG. 7 depicts a textured three-dimensional model 210 in which outlier pixels have not been removed, and a textured three-dimensional model 212 in which outlier pixels have been removed. Textured model 210 depicts various automobiles travelling along a highway, such as automobile 214. Automobile 214 can include one or more pixels. The one or more pixels can be detected in a source image and removed from the weighted average, such that the one or more pixels are not included in determining a texture for the three-dimensional model. For instance, in textured model 212, the various automobiles including automobile 214 have been removed from the weighted average and are not included in the texture.

Referring back to FIG. 6, once the weights have been assigned to the source images and the one or more outlier pixels have been removed, method (400) can include determining a weighted average of pixel color values (406). For instance, for each pixel in the plurality of source images corresponding to the mesh point, the weight associated with the pixel can be multiplied by the pixel's color value, and the resulting values can be averaged to determine a weighted average. The weighted average can be used in determining a texel value of the texture to be rendered in conjunction with the mesh point.

Method (400) can further include associating the weighted average with the mesh point (408). The texture can be generated based at least in part on the weighted averages for all mesh points.

Referring back to FIG. 3, method (300) can include processing the texture to improve the texture appearance (310). The processing can include a texture sharpening process. The texture sharpening process can provide an increase in the resolution of the texture. The processing can further include a histogram stretching process. The histogram stretching process can restore contrast to the texture.

Example Computing Systems for Determining a Texture for a Polygon Mesh

Figure 8:
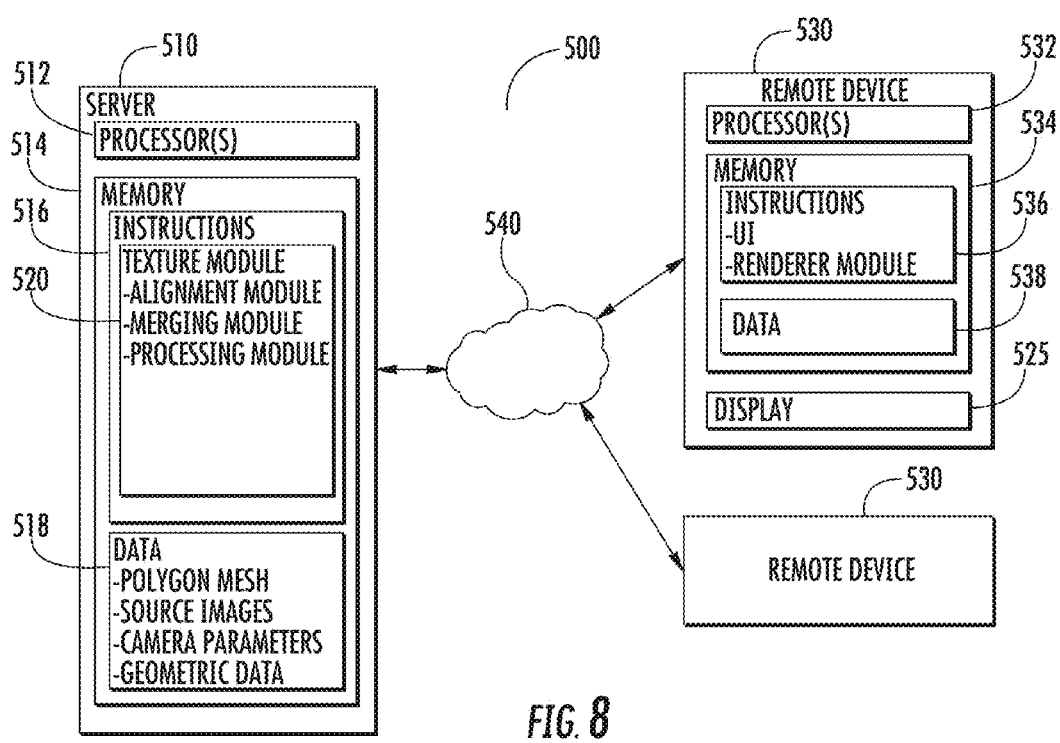
FIG. 8 depicts an example computing system according to example embodiments of the present disclosure.

FIG. 8 depicts an example computing system 500 that can be used to implement the methods and systems according to example aspects of the present disclosure. The system 500 can be implemented using a client-server architecture that includes a server 510 that communicates with one or more client devices 530 over a network 540. The system 500 can be implemented using other suitable architectures, such as a single computing device.

The system 500 includes a server 510, such as a web server. The server 510 can be implemented using any suitable computing device(s). The server 510 can have one or more processors 512 and memory 514. The server 510 can also include a network interface used to communicate with one or more client devices 530 over network 540. The network interface can include any suitable components for interfacing with one or more networks, including for example, transmitters, receivers, ports, controllers, antennas, or other suitable components.

The one or more processors 512 can include any suitable processing device, such as a microprocessor, microcontroller, integrated circuit, logic device, or other suitable processing device. The memory 514 can include any one or more computer-readable media, including, but not limited to, non-transitory computer-readable media, RAM, ROM, hard drives, flash drives, or other memory devices. The memory 514 can store information accessible by the one or more processors 512, including computer-readable instructions 516 that can be executed by the one or more processors 512. The instructions 516 can be any set of instructions that when executed by the one or more processors 512, cause the one or more processors 512 to perform operations. For instance, the instructions 516 can be executed by the one or more processors 512 to implement one or more modules configured to implement a texture module 520 and/or various aspects of any of the methods disclosed herein.

The texture module 520 can be configured to generate a texture to be rendered in conjunction with a polygon mesh according to example embodiments of the present disclosure. The texture module 520 can include one or more modules, such as an alignment module, a merging module and/or a processing module. The alignment module can be configured to align a plurality of source images. The merging module can be configured to determine a texture for a polygon mesh, such as in method (400) depicted in FIG. 6. The processing module can be configured to process a texture associated with a polygon mesh.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or, optical or magnetic media. When software is used, any suitable programming language or platform can be used to implement the module.

Memory 514 can also include data 518 that can be retrieved, manipulated, created, or stored by the one or more processors 512. The data 518 can include, for instance, a polygon mesh, a plurality of source images, various camera parameters, geometric data and other information. The data 518 can be stored in one or more databases. The one or more databases can be connected to the server 510 by a high bandwidth LAN or WAN, or can also be connected to server 510 through network 540. The one or more databases can be split up so that they are located in multiple locales.

The server 510 can exchange data with one or more client devices 530 over the network 540. Although two client devices 530 are illustrated in FIG. 8, any number of client devices 530 can be connected to the server 510 over the network 540. Each of the client devices 530 can be any suitable type of computing device, such as a general purpose computer, special purpose computer, laptop, desktop, mobile device, smartphone, tablet, wearable computing device, a display with one or more processors, or other suitable computing device.

Similar to the server 510, a client device 530 can include one or more processor(s) 532 and a memory 534. The one or more processor(s) 532 can include one or more central processing units (CPUs), graphics processing units (GPUs) dedicated to efficiently rendering images, and/or other processing devices. The memory 534 can include one or more computer-readable media and can store information accessible by the one or more processors 532, including instructions 536 that can be executed by the one or more processors 532 and data 538. For instance, the memory 534 can store instructions 536 for implementing a user interface module and a renderer module for presenting textured three-dimensional models to a user. The textures can be generated according to example aspects of the present disclosure.

The client device 530 of FIG. 8 can include various input/output devices for providing information to and receiving information from a user, such as a touch screen, touch pad, data entry keys, speakers, and/or a microphone suitable for voice recognition. For instance, the client device 530 can have a display 535 for presenting imagery to a user.

The client device 530 can also include a network interface used to communicate with one or more remote computing devices (e.g. server 510) over the network 540. The network interface can include any suitable components for interfacing with one or more networks, including for example, transmitters, receivers, ports, controllers, antennas, or other suitable components.

The network can be any type of communication network, such as local area network (e.g. intranet), wide area network (e.g. Internet), cellular network, or some combination thereof. The network 540 can also include a direct connection between a client device 530 and the server 510. In general, communication between the server 510 and a client device 530 can be carried via network interface using any type of wired and/or wireless connection, using a variety of communication protocols (e.g. TCP/ICP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining a texture for rendering in conjunction with a three-dimensional model of a geographic area, the method comprising:
    accessing, by one or more computing devices, a polygon mesh modeling a geographic area;
    identifying, by the one or more computing devices, a plurality of source images depicting the geographic area corresponding to the polygon mesh;
    aligning, by the one or more computing devices, the plurality of source images to reduce projection misalignments between source images when projected to the polygon mesh; and
    determining, by the one or more computing devices, a texel value for a texture associated with a point on the surface of the polygon mesh based at least in part on a weighted average, the weighted average determined at least in part from a plurality of pixels in the plurality of source images corresponding to the point on the surface of the polygon mesh;
    wherein the method comprises identifying an outlier pixel in the plurality of pixels corresponding to the point on the surface of the polygon mesh; and excluding the outlier pixel from inclusion in the weighted average in determining the texel value for the point on the surface of the polygon mesh to allow for removal of transient objects from the three-dimensional model.

2. The computer-implemented method of claim 1, wherein the at least one outlier pixel is associated with a moving object depicted in the plurality of source images.

3. The computer-implemented method of claim 1, wherein the plurality of source images are aligned using an approximate pose model, the approximate pose model defining a projection onto the polygon mesh based on a global shift plus warping function.

4. The computer-implemented method of claim 1, wherein the polygon mesh comprises a three-dimensional model of a geographic area.

5. The computer-implemented method of claim 1, wherein the plurality of source images comprise aerial imagery of a geographic area.

6. The computer-implemented method of claim 5, wherein aligning, by the one or more computing devices, the plurality of source images further comprises solving, by the one or more computing devices, for a texel color for the point on the surface of the polygon mesh.

7. The computer-implemented method of claim 6, wherein the alignment parameter and texel color are solved for simultaneously.

8. The computer-implemented method of claim 6, wherein the alignment parameter and texel color are solved for separately and iteratively.

9. The computer-implemented method of claim 1, wherein aligning, by the one or more computing devices, the plurality of source images comprises solving, by the one or more computing devices, for an alignment parameter for each of the plurality of source images.

10. The computer implemented method of claim 1, wherein the weighted average is determined, by the one or more computing devices, at least in part by assigning, by the one or more computing devices, a weight to each source image in the plurality source images.

11. The computer-implemented method of claim 10, wherein the weight assigned to each source image in the plurality of source images is determined based at least in part on a visibility score associated with a source image, the visibility score indicative of the degree to which the point in the geographic area corresponding to the point on the surface of the polygon mesh is visible in a source image.

12. The computer implemented method of claim 11, wherein the weight assigned to each source image in the plurality of source images is determined based at least in part on a distance between a camera position associated with a source image and the point in the geographic area corresponding to the point on the surface of the polygon mesh.

13. The computer-implemented method of claim 11, wherein the weight assigned to each source image in the plurality of source images is determined based at least in part on a viewing direction of a source image relative to the point in the geographic area corresponding to the point on the surface of the polygon mesh.

14. The computer-implemented method of claim 1, further comprising processing, by the one or more computing devices, the texture using a texture sharpening process.

15. The computer-implemented method of claim 14, wherein processing, by the one or more computing devices, the texture further comprises applying a histogram stretching process to the texture.

16. A computing system, comprising:
one or more processors; and
one or more computer-readable media storing computer-readable instructions that when executed by the one or more processors cause the one or more processors to perform operations, the operations comprising:
accessing a polygon mesh modeling a geographic area;
identifying a plurality of source images depicting the geographic area corresponding to the polygon mesh;
aligning the plurality of source images to reduce projection misalignments between source images when projected to the polygon mesh; and
determining a texel value for a texture associated with a point on the surface of the polygon mesh based at least in part on a weighted average, the weighted average determined at least in part from a plurality of pixels in the plurality of source images corresponding to the point on the surface of the polygon mesh;
wherein the operations comprise identifying an outlier pixel in the plurality of pixels corresponding to the point on the surface of the polygon mesh; and excluding the outlier pixel from inclusion in a determination of the weighted average in determining the texel value for the point on the surface of the polygon mesh to allow for removal of transient objects from the three-dimensional model.

17. The computing system of claim 16, wherein the at least one outlier pixel is associated with a moving object depicted in the plurality of source images.

18. The computing system of claim 16, wherein the plurality of source images are aligned using an approximate pose model, the approximate pose model defining a projection onto the polygon mesh based on a global shift plus warping function.

19. One or more non-transitory computer-readable media storing computer-readable instructions that when executed by one or more processors cause the one or more processors to perform operations, the operations comprising:
accessing a polygon mesh modeling a geographic area;
identifying a plurality of source images depicting the geographic area corresponding to the polygon mesh;
aligning the plurality of source images to reduce projection misalignments between source images when projected to the polygon mesh; and
determining a texel value for a texture associated with a point on the surface of the polygon mesh based at least in part on a weighted average, the weighted average determined at least in part from a plurality of pixels in the plurality of source images corresponding to the point on the surface of the polygon mesh;
wherein the operations comprise identifying an outlier pixel in the plurality of pixels corresponding to the point on the surface of the polygon mesh; and excluding the outlier pixel from inclusion in a determination of the weighted average in determining the texel value for the point on the surface of the polygon mesh to allow for removal of transient objects from the three-dimensional model.

20. The one or more non-transitory computer-readable media of claim 19, wherein the at least one outlier pixel is associated with a moving object depicted in the plurality of source images.

* * * * *